United States Patent [19]

Kempermann et al.

[11] 3,844,970
[45] Oct. 29, 1974

[54] PROCESS FOR THE VULCANISATION OF NATURAL AND/OR SYNTHETIC RUBBERS MADE FROM HALOGEN-FREE DIENES

[75] Inventors: Theo Kempermann; Ulrich Eholzer, both of Cologne; Hermann Westlinning, Kleinostheim; Horst Fleischhauer, Grossauheim, all of Germany

[73] Assignees: Bayer Aktiengesellschaft, Leverkusen; Deutsche Gold-Und Silber-Scheideanstalt Vormals Roessler, Frankfurt/Main, both of, Germany

[22] Filed: Apr. 24, 1972

[21] Appl. No.: 246,646

[30] Foreign Application Priority Data
Apr. 26, 1971 Germany............................ 2120288

[52] U.S. Cl...... 252/182, 260/45.8 NT, 260/79.5 B, 260/249.5, 260/784, 260/791
[51] Int. Cl. ....................... C08f 45/48, C08g 51/48
[58] Field of Search ......... 252/182; 260/249.5, 784, 260/79.5 B, 45.8 NT, 791

[56] References Cited
UNITED STATES PATENTS

| 3,240,749 | 3/1966 | Dexter et al. ..................... 260/249.5 |
| 3,250,772 | 5/1966 | Dexter et al. ..................... 260/249.5 |
| 3,413,268 | 11/1968 | Feichtinger et al. ............. 260/249.5 |
| 3,415,824 | 12/1968 | Biland et al. ..................... 260/249.5 |
| 3,558,739 | 1/1971 | Kagarise ............................. 260/784 |

Primary Examiner—Carl D. Quarforth
Assistant Examiner—Irwin Gluck
Attorney, Agent, or Firm—Connolly and Hutz

[57] ABSTRACT

The invention relates to a vulcanisation accelerator combination and their use for a process for vulcanising natural and/or synthetic rubber made from halogen-free dienes. As vulcanisation accelerators triazines substituted in the 2, 4 and 6 positions in combination with at least one thiazole accelerator and optionally at least one thiuram accelerator are used. This accelerator combination obviate the disadvantage of the long cure time when using the triazine accelerator alone without loss of the advantage of the high moduli.

8 Claims, No Drawings

PROCESS FOR THE VULCANISATION OF NATURAL AND/OR SYNTHETIC RUBBERS MADE FROM HALOGEN-FREE DIENES

This invention relates to a process for the vulcanisation of natural and synthetic rubbers which have been made from dienes which are halogen-free in the presence of sulphur and/or sulphur donors and in particular to vulcanisation accelerators for such a process.

It is known to use derivatives of 1,3,5-triazine of the general formula (I) as vulcanisation accelerators for the sulphur vulcanisation of diene rubbers (British Patent Specification No. 1,095,219).

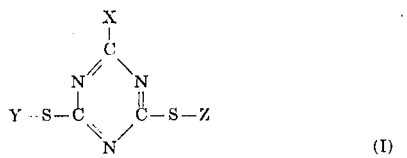
(I)

In general formula (I),

X represents hydrogen, alkyl, substituted alkyl, alkenyl, substituted alkenyl, aryl, substituted aryl, aralkyl, substituted aralkyl radicals or a heteroatom which is attached to one or more of the above-mentioned substituents, Y and Z may be the same or different and represent a. hydrogen,
b. the radical

—S—R wherein R denotes an alkyl, alkenyl, aryl or aralkyl radical or a heterocyclic ring system, c. the radical

wherein $R_1$ and $R_2$ are the same or different and represent hydrogen, alkyl, alkenyl, aryl or aralkyl groups, or d. a radical of the general formula (II)

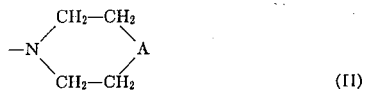
(II)

wherein A may denote

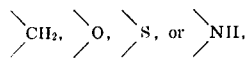

in which the H may be substituted.

A vulcanisation accelerator which is particularly suitable for the sulphur vulcanisation of diene rubbers is 2-diethylamine-4,6-bis-(cyclohexyl-sulphenamido)-s-triazine, hereinafter referred to as triazine accelerator B, which results in high moduli of the vulcanisates even when used in small doses.

The derivatives of 1,3,5-triazine of the general formula (I), and especially accelerator B have, however, one disadvantage when used alone as accelerators. Because they only cause a slow vulcanisation, they require a relatively long cure time. Their flow time/cure time ratio is therefore unfavourable.

It is also known that mercapto accelerators (see S. Boström, Kautschuk-Handbuch, volume 4, pages 300–307, et seq., Stuttgart 1961) such as dibenzothiazyl disulphide (MBTS), 2-mercaptobenzothiazole (MBT) or the zinc salt of 2-mercaptobenzothiazole give rise to relatively low moduli when used as sole accelerators, especially if only low doses of sulphur are used (about 0.6 to 1.5 phr of sulphur) as is the case with so-called efficient or semi-efficient vulcanisation systems used for the production of heat-resistant vulcanisates. For comparison reference is made to Example 2 (mixture No. 7) in which dibenzothiazyl disulphide (MBTS) gives rise to a relatively low modulus when the sulphur dose is 1.0 phr. The above-mentioned accelerators of the mercapto accelerator type do not give satisfactory yields and must therefore be used in relatively high doses, especially when only small quantities of sulphur are used.

The use of sulphenamides of 2-mercaptobenzothiazole is also known (see Ullmann's Enzyklopadie der technischen Chemie, 3rd edition, volume 9, page 386, publishers Urban & Schwarzenberg, Munich — Berlin 1957). As can be seen from Example 1, N-cyclohexyl benzothiazole-2-sulphenamide (CBS), which is the most frequently used of these sulphenamides in practice, is much less effective than the triazine accelerator B. A dose of only 0.5 phr of triazine accelerator B provides practically the same maximum modulus as twice that dose of CBS (1.0 phr).

The invention is based on the problem of finding a vulcanisation accelerator which would obviate the disadvantage of the long cure time without loss of the advantage of the high moduli.

The problem was solved by finding a mixture of special accelerators for vulcanisation.

This invention therefore relates to a process for the vulcanisation of natural and synthetic rubbers made from halogen-free dienes in the presence of sulphur and/or sulphur donors and vulcanisation accelerators, wherein the vulcanisation accelerators used are combinations of a. 2,4,6-triazine compounds of the general formula (III)

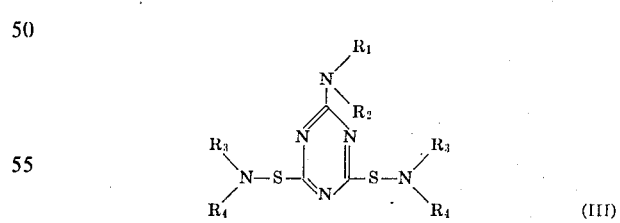
(III)

in which the radicals $R_1$ and $R_2$ may be the same or different and represent hydrogen, straight-chain or branched chain alkyl groups containing one to six carbon atoms or phenyl groups or $R_1$ and $R_2$ taken together may form a 5- to 7-membered ring which may contain an additional oxygen atom.

$R_3$ and $R_4$ may be the same or different and represent straight-chain or branched chain alkyl radicals containing one to six carbon atoms or taken together may form a 5- to 7-membered ring which may also contain an additional oxygen atom, and one of the radicals $R_3$ or $R_4$ may be hydrogen;
b. a vulcanisation accelerator of the thiazole type and optionally
c. a vulcanisation accelerator of the thiuram type.

This invention also relates to mixtures of the vulcanisation accelerators and mixtures of the accelerators with natural and synthetic rubbers produced from halogen-free dienes.

The vulcanisation accelerator preferably used is a mixture of 2-diethylamino-4,6-bis-(cyclohexyl-sulphenamido)-s-triazine (see group a), dibenzothiazyl disulphide or N-cyclohexyl-benzothiazole-2-sulphenamide (see group b) and optionally tetramethylthiuram disulphide or tetramethyl thiuram monosulphide (see group c).

The following are mentioned as further examples of suitable compounds of group a of the general formula (III):
2-methyleno-4,6-bis-(N-cyclohexyl-sulphenamido)-s-triazine;
2-ethylamino-4,6-bis-(N-cyclohexyl-sulphenamido)-s-triazine;
2-n-propylamino-4,6-bis-(N-cyclohexyl-sulphenamido)-s-triazine; 2-iso-propylamino-4,6-bis-(N-cyclohexyl-sulphenamido)-s-triazine; 2-n-butylamino-4,6-bis-(N-cyclohexyl-sulphenamido)-s-triazine; 2-iso-butylamino-4,6-bis-(N-cyclohexyl-sulphenamido)-s-triazine; 2-dimethylamino-4,6-bis-(N-cyclohexyl-sulphenamido)-s-triazine; 2-di-n-propylamino-4,6-bis-(N-cyclohexyl-sulphenamido)-s-triazine;
2-di-iso-propylamino-4,6-bis-(N-cyclohexyl-sulphenamido)-s-triazine;
2-di-n-butylamino-4,6-bis-(N-cyclohexyl-sulphenamido)-s-triazine;
2-di-iso-butylamino-4,6-bis-(N-cyclohexyl-sulphenamido)-s-triazine;
2-methylamino-4,6-bis-(N-tert.-butyl-sulphenamido)-s-triazine;
2-ethylamino-4,6-bis-(N-tert.-butyl-sulphenamido)-s-triazine;
2-n-propylamino-4,6-bis-(N-tert.-butyl-sulphenamido)-s-triazine;
2-iso-propylamino-4,6-bis-(N-tert.-butyl-sulphenamido)-s-triazine;
2-n-butylamino-4,6-bis-(N-tert.-butyl-sulphenamido)-s-triazine;
2-iso-butylamino-4,6-bis-(N-tert.-butyl-sulphenamido)-s-triazine;
2-dimethylamino-4,6-bis-(N-tert.-butyl-sulphenamido)-s-triazine;
2-dimethylamino-4,6-bis-(N-tert.-butyl-sulphenamido)-s-triazine;
2-di-n-propylamino-4,6-bis-(N-tert.-butyl-sulphenamido)-s-triazine;
2-di-propylamino-4,6-bis-(N-tert.-butyl-sulphenamido)-s-triazine;
2-di-n-butylamino-4,6-bis-(N-tert.-butyl-sulphenamido)-s-triazine;
2-di-iso-butylamino-4,6-bis-(N-tert.-butyl-sulphenamido)-s-triazine;
2-methylamino-4,6-bis-(N-morpholinyl-sulphenamido)-s-triazine;
2-ethylamino-4,6-bis-(N-morpholinyl-sulphenamido)-s-triazine;
2-n-propylamino-4,6-bis-(N-morpholinyl-sulphenamido)-s-triazine;
2-iso-propylamino-4,6-bis-(N-morpholinyl-sulphenamido)-s-triazine;
2-n-butylamino-4,6-bis-(N-morpholinyl-sulphenamido)-s-triazine;
2-iso-butylamino-4,6-bis-(N-morpholinyl-sulphenamido)-s-triazine;
2-dimethylamino-4,6-bis-(N-morpholinyl-sulphenamido)-s-triazine;
2-diethylamino-4,6-bis-(N-morpholinyl-sulphenamido)-s-triazine;
2-di-n-propylamino-4,6-bis-(N-morpholinyl-sulphenamido)-s-triazine;
2-di-iso-propylamino-4,6-bis-(N-morpholinyl-sulphenamido)-s-triazine;
2-di-n-butylamino-4,6-bis-(N-morpholinyl-sulphenamido)-s-triazine;
2-di-iso-butylamino-4,6-bis-(N-morpholinyl-sulphenamido)-s-triazine;
2-tert.-butylamino-4,6-bis-(N-tert.-butyl-sulphenamido)-s-triazine;
2-amino-4,6-bis-(N-cyclohexyl-sulphenamido)-s-triazine;
2-morpholino-4,6-bis-(N-piperidino-sulphenamido)-s-triazine;
2-anilido-4,6-bis-(N-cyclohexyl-sulphenamido)-s-triazine;
2-diphenylamino-4,6-bis-(N-cyclohexyl-sulphenamido)-s-triazine.

The following are given as examples of vulcanisation accelerators from the group of thiazole accelerators (group b):
N-cyclohexyl-2-benzothiazole-sulphenamide (CBS); dibenzothiazyl disulphide (MBTS); 2-mercaptobenzothiazole (MBT); the zinc salt of 2-mercaptobenzothiazole; N-tert.-butyl-2-benzothiazole-sulphenamide (TBS) and 4-(benzothiazole-2-sulphenyl)-morpholine (OBS). N-cyclohexyl-2-benzothiazole-sulphenamide and dibenzothiazole disulphide are preferred.

The following are given as examples of vulcanisation accelerators from the group of thiuramic accelerators (group c) which may be included if desired:
tetraethylthiuram disulphide (TETD) tetramethylthiuram monosulphide (TMTM), dimethyl diphenylthiuram disulphide and tetramethylthiuram disulphide (TMTD). Tetramethylthiuram disulphide and tetramethylthiuram monosulphide are preferred.

The process according to the invention succeeds in obviating the disadvantage of the long cure time required for hitherto known triazine accelerators without any loss of their main advantage i.e. the high moduli which can be obtainned by their use even at low dosages. The combination according to the invention therefore combine the advantages of short cure times at low doses with resulting high moduli and therefore operate very economically. It could not be foreseen that the high degree of cross-linking of the vulcanisates would be preserved when replacing part of the triazine accelerator, which is very effective when used alone, with a thiazole accelerator which is much less effective when used alone.

The individual components a, b and c of the accelerator combinations according to the invention may advantageously be used in the following quantities (parts by weight based on 100.0 parts by weight of rubber):

triazine accelerator from about 0,05 to about 3, preferably 0.1 to 0.5;

thiazole accelerator from about 0.1 to 4, preferably 0.1 to 0.5;

Thiuram accelerator from 0 to 2, preferably 0.01 to 0.5.

The quantity of sulphur to be used is between 0.2 and about 4 parts by weight. Sulphur donors such as N,N'-dithio-bis-morpholine, dipentamethylenethiuram tetrasulphide, N,N'-dithio-bis-hexahydro-2H-azepinone-(2) and 2-benzothiazyldithio-N-morpholine may also be used.

The process according to the invention is very useful for vulcanising diene rubber which have been made from dienes which are halogen-free. The following diene rubbers are given as examples:

styrene-butadiene rubber (SBR), natural rubber (NR), nitrile rubber (NBR), polybutadiene (BR), polyisoprene (IR), transpolypentenamer (trans-PA) (see Kautschuk und Gummi, Kunststoffe 23, 502 et seg. (1970) publishers: Verlag für Radio, Photo and Kinotechnik, Berlin). Styrene-butadiene rubbers are preferred.

There may also be used mixtures of various diene rubbers.

The individual components of the accelerator system may be added to the dine rubbers or rubber mixtures before vilcanisation, either separately or in the form of a mixture or a rubber-accelerator master batch (see Ullmann's) Enzyklopädie der technischen Chemie, 3rd edition, publishers: Urban & Schwarzenberg, Munich — Berlin 1957, volume 9, page 364).

The diene rubbers may contain one or more of the usual additives such as fillers, in particular carbon black, mineral oils, plasticisers, adhesifying agents, accelerator activators, especially stearic acid and/or zinc oxide, waxes, age-resistors, anti-ozone agents, blowing agents, dyes and pigments.

Fillers such as the various types of carbon black used in the rubber processing industry, silica, particularly in a finely divided form obtained by wet precipitation or in the gaseous phase from volatile silicon halides and hydrophobic silica, and finely divided metal oxides including mixed oxides and oxide mixtures are valuable constituents for the mixture.

Vulcanisation of the diene rubbers is generally carried out at temperatures of between about 100° C. and about 300° C., preferably at 140° C. to 240° C. Any of the usual vulcanisation processes used in the art as heating in a press or heating with super-heated steam or hot air or in a salt bath or fluidised bed or with ultra-high frequency or in a steam pipe may be used.

The effectiveness of one of the accelerator combinations according to the invention in styrene-butadiene rubber is illustrated in Example 1. Triazine accelerator B (mixture 2) requires a long cure time ($t_{90}$). Dibenzothiazyl disulphide (MBTS) used alone (mixture 4) in the same dose (0.5 phr) gives rise to a slightly lower modulus and also requires a relatively long total cure time.

The combination according to the invention of 0.25 phr of triazine accelerator B and 0.25 phr of MBTS (mixture 3) surprisingly requires a shorter total cure time than MBTS used alone and above all requires only about 67 percent of the total cure time of B used alone. The modulus obtained with the combination is distinctly higher than that obtained with either of the two individual components used in the same total dose.

Example 1 illustrates the high yield of triazine accelerator B which when used in a dose of only 0.5 phr (mixture 2) provides practically the same modulus maximum as 1.0 phr of N-cyclohexylbenzothiazole-2-sulphenamide (CBS) (mixture 1) but requires more than twice the total cure time ($t_{90}$).

Accelerator combinations frequently used in practice for the sulphur vulcanisation of diene rubbers consist of mercapto accelerators such as 2-mercaptobenzothiazole (MBT) or dibenzothiazyl disulphide (MBTS) and diphenyl guanidine (DPG) (see S. Bostrom, Kautschuk-Handbuch, volume 4, Stuttgart 1961, pages 300–304 and pages 320–321).

Example 1 also demonstrates the superiority of a combination according to the invention of triazine accelerator B and dibenzothiazyl disulphide, which in this case also contains tetramethylthiuram disulphide as additional accelerator (mixture 5), over a conventional combination of dibenzothiazyl disulphide and diphenyl guanidine (mixture 6). The accelerator combination according to the invention (mixture 5) consists of a total of only 0.3 phr of accelerator compared with 1.0 phr of accelerator in mixture 6 and yet is superior in essential features and provides better resistance in scorching and higher modulus maximum and requires practically the same total cure time.

Example 2 demonstrates the effectiveness of a combination according to the invention of dibenzothiazyl disulphide (MBTS) and triazine accelerator B (mixture 8) compared with that of triazine accelerator B used alone (mixture 9), the total dose being the same in both cases and used with a low sulphur dose (1.0 phr) of the kind which may be used for the production of heat-resistant vulcanisates.

With this low sulphur dose, dibenzothiazyl disulphide (MBTS) (mixture 7) results in only a relatively low modulus. The modulus obtained with the combination according to the invention (mixture 8) is substantially higher than that obtained with MBTS and even higher than that obtained with the not combined triazine accelerator B (mixture 9). The total cure time ($t_{90}$) is slightly shorter than that required for the not combined products.

Example 3 demonstrates the effectiveness of the accelerator combination according to the invention when used in natural rubber. Dibenzothiazyl disulphide (MBTS) used along (mixture 10) provides a relatively low modulus. Mixtures 11, 12 and 13 in which combinations of MBTS and triazine accelerator B were used as vulcanisation accelerators result in moduli which are significantly higher than those obtained with mixture 10 and in part also higher than those obtained with mixture 14 which contains triazine accelerator B on its own. Above all, mixtures 11, 12 and 13 require a shorter total cure time ($t_{90}$) than mixtures 10 and 14 with the uncombined individual components.

Example 4 shows the results obtained with a combination of triazine accelerator B and N-cyclohexylbenzothiazole-2-sulphenamide (CBS). CBS used alone (mixture 15) results in a substantially lower modulus than the mere triazine accelerator B (mixture 17). The combination according to the invention (mixture 16) of the two accelerators results in practically the same modulus as the mere triazine accelerator but with a shorter total cure time.

A combination with even better yield is obtained by adding a very small quantity of tetramethylthiuram monosulphide (TMTM) (mixture 18). This combination, which contains a total of only 0.47 phr of accelerators, provides the same scorch resistance and the same modulus and requires the same total cure time as 1.0 phr of CBS (mixture 15). This combination according to the invention of triazine accelerator B, thiazole accelerator N-cyclohexylbenzothiazole-2-sulphenamide (CBS) and thiuram accelerator tetramethylthiuram monosulphide (TMTM) is more economical than N-cyclohexyl-benzothiazole-2-sulphenamide (CBS) by virtue of its surprisingly higher yield; it constitutes a preferred embodiment of the process of the invention.

The data given in the following examples were obtained as follows:
the test formulations listed in Table 1 were used to prepare rubber mixtures in an interval mixer by the usual method. Sulphur and vulcanisation accelerator were then mixed in by use of a rolling mill. The mixtures then were made up into test slabs of 4 mm in thickness by vulcanisation in a press (stepwise heating at the temperatures indicated in the examples). The individual data were obtained by the test methods indicated in Table 2.

Table 1

| Constituents of the mixture (phr) | Test formulations I (Example 1,2,4) | II (Example 3) |
|---|---|---|
| Styrene-butadiene rubber | 100.0 | — |
| Natural rubber (smoked sheets) | — | 100.0 |

Table 1 — Continued

| Constituents of the mixture (phr) | Test formulations I (Example 1,2,4) | II (Example 3) |
|---|---|---|
| High abrasion furnace black (N 330, HAF) | 45.0 | — |
| Carbon black N 220, ISAF | — | 42.0 |
| Zinc oxide | 5.0 | 5.0 |
| Aromatic mineral oil | 4.0 | 3.0 |
| Naphthenic mineral oil | 4.0 | — |
| Stearic acid | 1.5 | 3.0 |
| Phenyl-$\beta$-naphthylamine | 0.5 | 1.0 |
| N-phenyl-N'-isopropyl-p-phenylene diamine | 1.5 | 1.5 |
| Sulphur / Accelerator | as indicated in the examples | |

Table 2

| Test methods and abbreviations | | |
|---|---|---|
| 1) | Scorch time | By analogy with the Mooney scorch time (see DIN 53 524) determined from the modulus/cure time curve. Increase of modulus at 300% elongation by 20 points above the minimum (step-cure) |
| 2) | M 300, M 400 | Maximum modulus at 300% elongation and 400% elongation respectively(kgf/cm$^2$), DIN 53 504, sheet 2 |
| 3) | Total cure time $t_{90}$ (min) | Time required to reach 90% of the maximum modulus at 300% and 400% elongation, respectively, at the temperature indicated. |

Example 1
Styrene-butadiene rubber, 1.8 phr of sulphur
(test formulation I, see Table 1)

| Mixture No. | Vulcanisation accelerator | Dose (phr) | Scorch time[1] at 130°C (min) | M 300[2] Maximum modulus at 150°C (kgf/cm$^2$) | Total cure time $t_{90}$[3] at 150°C (min) |
|---|---|---|---|---|---|
| 1 | CBS | 1.0 | 35 | 99 | 24 |
| 2 | B | 0.5 | 43 | 98 | 54 |
| 3 | B | 0.25 | | | |
| | MBTS | 0.25 | 38 | 113 | 36 |
| 4 | MBTS | 0.5 | 35 | 95 | 45 |
| 5 | B | 0.1 | | | |
| | MBTS | 0.1 | 23 | 94 | 24 |
| | TMTD | 0.1 | | | |
| 6 | MBTS | 0.6 | | | |
| | DPG | 0.4 | 20 | 88 | 23 |

Example 2
Styrene-butadiene rubber, 1.0 phr of sulphur
(test formulation I, see Table 1)

| Mixture No. | Vulcanisation accelerator | Dose (phr) | Scorch time[1] at 130°C (min) | M400[2] Maximum modulus at 150°C (Kgf/cm$^2$) | Total cure time $t_{90}$[3] at 150°C (min) |
|---|---|---|---|---|---|
| 7 | MBTS | 0.5 | 45 | 90 | 41 |
| 8 | B | 0.25 | 43 | 112 | 38 |
| | MBTS | 0.25 | | | |
| 9 | B | 0.5 | 53 | 104 | 40 |

Example 3
Natural rubber, 2.35 phr of sulphur
(test formulation II, see Table 1)

| Mixture No. | Vulcanisation accelerator | Dose (phr) | Scorch time[1] at 120°C (min) | M 300[2] Maximum modulus at 150°C (kgf/cm²) | Total cure time $t_{90}$[3] at 150°C (min) |
|---|---|---|---|---|---|
| 10 | MBTS | 0.5 | 18 | 88 | 12 |
| 11 | B | 0.125 | 20 | 98 | 10.5 |
|  | MBTS | 0.375 |  |  |  |
| 12 | B | 0.25 | 25 | 105 | 10 |
|  | MBTS | 0.25 |  |  |  |
| 13 | B | 0.375 | 35 | 108 | 10.5 |
|  | MBTS | 0.125 |  |  |  |
| 14 | B | 0.5 | 53 | 102 | 16 |

Example 4
Styrene-butadiene rubber, 1.8 phr of sulphur
test formulation I, see Table 1

| Mixture No. | Vulcanisation accelerator | Dose (phr) | Scorch time[1] at 130°C (min) | M 300[2] Maximum modulus at 150°C (Kgf/cm²) | Total cure time $t_{90}$[3] at 150°C (min) |
|---|---|---|---|---|---|
| 15 | CBS | 1.0 | 40 | 96 | 24 |
| 16 | B | 0.5 | 53 | 120 | 28 |
|  | CBS | 0.5 |  |  |  |
| 17 | B | 1.0 | 55 | 121 | 36 |
| 18 | B | 0.2 | 40 | 97 | 24 |
|  | CBS | 0.2 |  |  |  |
|  | TMTM | 0.07 |  |  |  |

What we claim is:

1. A vulcanization accelerator composition comprising
a. 0.05 to about 3 parts by weight of at least one 2,4,6-triazine of the formula

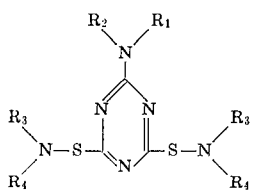

wherein $R_1$ and $R_2$, which may be the same or different, are hydrogen, alkyl having one to six carbon atoms or phenyl, or $R_1$ and $R_2$, taken together, complete with the nitrogen atom to which they are attached, a 5- or 7-membered ring which may contain oxygen as a hetero atom and $R_3$ and $R_4$, which may be the same or different, are each alkyl having one to six carbon atoms or one is alkyl having one to six carbon atoms and the other is hydrogen or $R_3$ and $R_4$, taken together, complete with the nitrogen atom to which they are attached, a 5- to 7-membered ring which may contain oxygen as a hetero atom and
b. 0.1 to about 4 parts by weight of at least one thiazole accelerator.

2. The composition of claim 1 containing (c) up to 2 parts by weight of at least one thiuram accelerator.

3. The composition of claim 1 wherein (b) is dibenzothiazyl disulphide, 2-mercaptobenzothiazole, the zinc salt of 2-mercaptobenzothiazole, N-cyclohexyl-benzothiazole-2-sulphenamide, N-t-butyl-benzothiazole-2-sulphenamide or 4-(benzothiazole-2-sulphenyl)-morpholine.

4. The composition of claim 2 wherein (c) is tetramethylthiuram disulphide, tetraethylthiuram disulphide, tetramethylthiuram monosulphide or dimethyl diphenyl thiuram disulphide.

5. The composition of claim 1 wherein (a) is 2-diethylamino-4,6-bis-(cyclohexyl-sulphenamido)-s-triazine and (b) is dibenzothiazole disulphide.

6. The composition of claim 2 wherein (a) is 2-diethylamino-4,6-bis-(cyclohexyl-sulphenamido)-s-triazine, (b) is dibenzothiazole disulphide and (c) is tetramethylthiuram disulphide.

7. The composition of claim 1 wherein (a) is 2-diethylamino-4,5-bis-(cyclohexyl-sulphenamido)-s-triazine and (b) is N-cyclohexyl-benzothiazole-2-sulphenamide.

8. The composition of claim 2 wherein (a) is 2-diethylamino-4,5-bis-(cyclohexyl-sulphenamido)-s-triazine, (b) is N-cyclohexyl-benzothiazole-2-sulphenamide and (c) is tetramethylthiuram monosulphide.

* * * * *